US011756376B2

(12) United States Patent
Puglisi et al.

(10) Patent No.: US 11,756,376 B2
(45) Date of Patent: Sep. 12, 2023

(54) GUEST-FACING GAME INFORMATION MANAGEMENT SYSTEMS AND METHODS

(71) Applicant: Universal City Studios LLC, Universal City, CA (US)

(72) Inventors: Nicholas Anthony Puglisi, Orlando, FL (US); Victor Alexander Lugo, Belle Isle, FL (US)

(73) Assignee: Universal City Studios LLC, Universal City, CA (US)

( * ) Notice: Subject to any disclaimer, the term of this patent is extended or adjusted under 35 U.S.C. 154(b) by 100 days.

(21) Appl. No.: 17/397,730

(22) Filed: Aug. 9, 2021

(65) Prior Publication Data

US 2022/0101684 A1 Mar. 31, 2022

Related U.S. Application Data

(60) Provisional application No. 63/084,893, filed on Sep. 29, 2020.

(51) Int. Cl.
*G07F 17/32* (2006.01)
(52) U.S. Cl.
CPC ...... *G07F 17/3227* (2013.01); *G07F 17/3206* (2013.01); *G07F 17/3213* (2013.01); *G07F 17/3239* (2013.01)
(58) Field of Classification Search
None
See application file for complete search history.

(56) References Cited

U.S. PATENT DOCUMENTS

| 5,772,508 A * | 6/1998 | Sugita | A63F 13/55 463/36 |
|---|---|---|---|
| 7,033,276 B2 | 4/2006 | Walker et al. | |
| 7,396,281 B2 * | 7/2008 | Mendelsohn | G06Q 30/0209 725/23 |
| 8,419,560 B2 | 4/2013 | Amini | |
| 9,067,140 B2 | 6/2015 | Opaluch | |
| 9,454,849 B2 | 9/2016 | Mount et al. | |

(Continued)

FOREIGN PATENT DOCUMENTS

WO 2017106972 A1 6/2017

OTHER PUBLICATIONS

PCT/US2021/051085 International Search Report and Written Opinion dated Dec. 22, 2021.

*Primary Examiner* — Kevin Y Kim
(74) *Attorney, Agent, or Firm* — Fletcher Yoder, P.C.

(57) ABSTRACT

An integrated game play system includes a game play platform, an amusement park, and a controller. The game play platform provides access to multiple games and the amusement park includes an attraction including one or more attraction features. Moreover, the controller detects presence of a guest on the game play platform and/or at the attraction, identifies the guest, and determines guest data based on the identification of the guest. In response to determining the guest data, the controller determines a modification to an organization of the multiple games on a display interface of the game play platform and/or a modification to the one or more attraction features (e.g., an animation, a lighting effect, and/or a sound effect), based on the guest data. The controller also sends a control signal indicative of the modification to the game play platform and/or the modification of the one or more attraction features.

20 Claims, 9 Drawing Sheets

(56) References Cited

U.S. PATENT DOCUMENTS

| | | | |
|---|---|---|---|
| 2004/0248588 A1* | 12/2004 | Pell | H04L 67/75 |
| | | | 707/E17.121 |
| 2007/0044539 A1* | 3/2007 | Sabol | G06Q 10/06 |
| | | | 73/19.01 |
| 2009/0131152 A1 | 5/2009 | Busse | |
| 2013/0045804 A1* | 2/2013 | Ruke | A63F 13/79 |
| | | | 463/40 |
| 2014/0038723 A1 | 2/2014 | Samdahl et al. | |
| 2019/0295306 A1 | 9/2019 | Weston | |
| 2020/0380788 A1* | 12/2020 | Hutten | G06T 19/006 |

* cited by examiner

GUEST-FACING GAME INFORMATION MANAGEMENT SYSTEMS AND METHODS

CROSS-REFERENCE TO RELATED APPLICATION

This application claims priority to and the benefit of U.S. Provisional Application No. 63/084,893, filed Sep. 29, 2020, and entitled "GUEST-FACING GAME INFORMATION MANAGEMENT SYSTEMS AND METHODS," the disclosure of which is incorporated by reference in its entirety for all purposes.

BACKGROUND

The present disclosure relates generally to the field of amusement parks. Specifically, embodiments of the present disclosure relate to techniques to customize a centralized game interface and an amusement park experience.

In certain entertainment settings, such as a gaming platform, a user interface of the gaming platform may uniformly display available or archived games for each user. That is, the gaming platform may provide the same organization of games on the user interface upon accessing the gaming platform. For example, the user interface may provide the same top ranked games, popular games, archived games, and so forth, for each user. As such, each user may browse through an entire database or list of available or archived games on the user interface before identifying a particular game of interest.

In some instances, the games and/or the user may be associated with an amusement park. For example, a user that accesses the gaming platform may also be a user that visits the amusement park. The amusement park may uniformly provide interactions at the amusement park, such that available interactions are the same for each individual at the amusement park. For example, the interactions may include the same animations, special effects, displays, and so forth, for each person visiting the amusement park.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, an integrated game play system includes a game play platform, an amusement park, and a controller. The game play platform provides access to multiple games and the amusement park includes an attraction including one or more attraction features. Moreover, the controller detects presence of a guest on the game play platform and/or at the attraction, identifies the guest, and determines guest data based on the identification of the guest. In response to determining the guest data, the controller determines a modification to an organization of the multiple games on a display interface of the game play platform and/or a modification to the one or more attraction features, based on the guest data. The controller also sends a control signal indicative of the modification to the game play platform and/or the modification of the one or more attraction features.

In one embodiment, a method includes receiving an indication that a guest is online on a game play platform and identifying the guest to be associated with a user identification. The method also includes determining guest data based on the user identification, in which the guest data corresponds to guest park activity at an amusement park associated with the game play platform. Additionally, the method includes modifying game play content on a display interface of the game play platform based on the guest data.

In one embodiment, another method includes receiving sensor data from one or more sensors indicating presence of a guest proximate to one or more attraction features of an amusement park attraction. The method also includes identifying the guest to be associated with a user identification and determining guest data based on the user identification. Additionally, the method includes receiving additional guest data from one or more third-party applications, updating the guest data based on the additional guest data from the third-party applications, and modifying the amusement park attraction based on the updated guest data.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
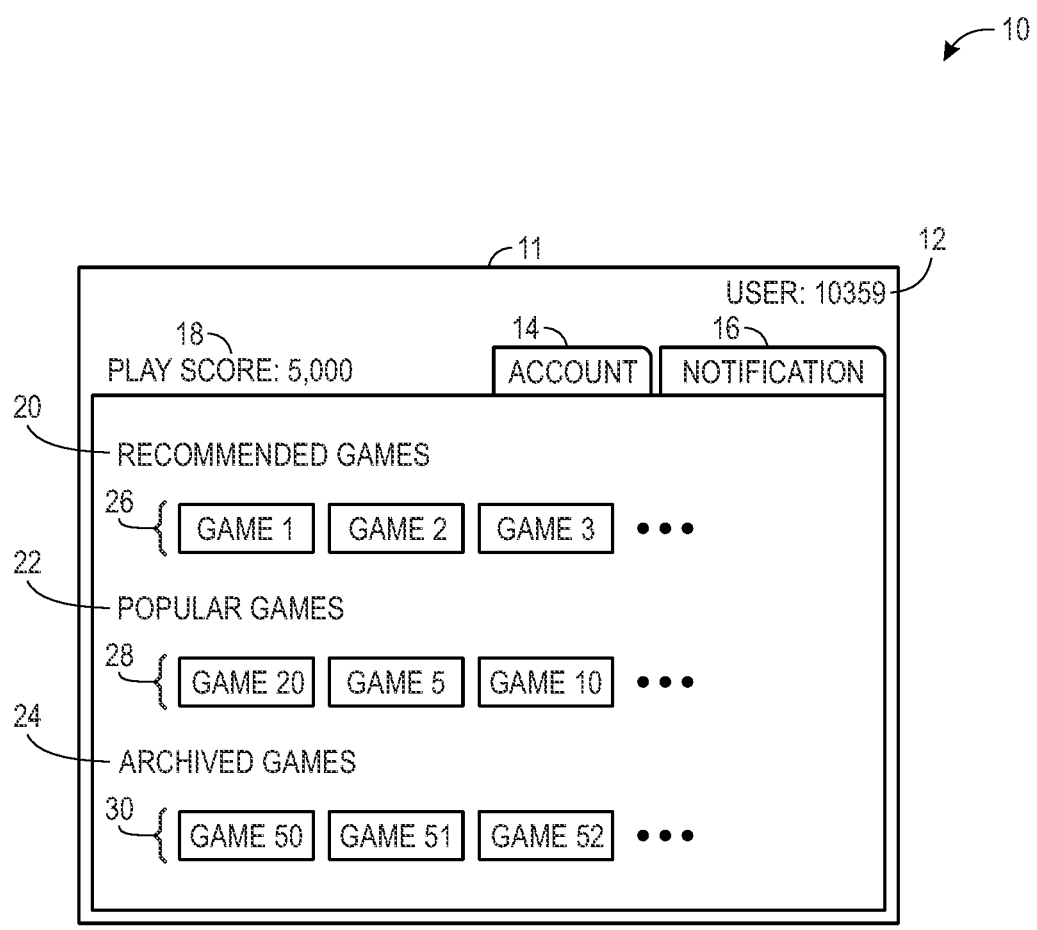
FIG. 1 is a schematic diagram of a game play hub, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment", "an embodiment", or "some embodiments" of the present disclosure are not intended to be interpreted as excluding the existence of additional embodiments that also incorporate the recited features. Use of the term "approximately" or "near" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

As used herein, a "game play hub" may refer to a platform for accessing one or more game applications, which may include any of various entertainment applications (e.g., arcade games, word games, immersive experiences, role-playing games, quiz games, social interfacing games). For example, a mobile or a web-based platform may allow access to a database of a variety of online games. The game play hub may additionally or alternatively allow access to third-party applications and their third-party data (e.g., social media data, work related data, health related data, etc.) associated with a guest, amusement park data associated with the guest, and other entertainment related data associated with the guest. That is, the game play hub may have and provide access to multiple sources of data. Also, as used herein, "guest-facing" may refer to something that involves providing a display for observation by a guest, interacting with the guest, or communicating with the guest, such as by a display interface, an animated figure, an attraction feature, etc. Additionally, as used herein, a "guest" or "user" may interchangeably refer to a person accessing an entertainment setting, such as the game play hub or an amusement park. Also, as used herein, "guest data" may include data associated with the guest, such as data from one or more sources (e.g., the game play hub, the amusement park, the third-party application, etc.). The guest data may be associated with and identified using a unique user identification (ID). By way of example, a guest-facing display interface of the game play hub may allow interacting with the guest, such as by selectable buttons, dialog boxes, fillable text fields, and so forth, on the interface. As another example, a guest-facing amusement park feature may include a ride with an interactive feature or an animated figure at the amusement park that interacts with the guest, such as by the animated figure asking the guest which rides the guest has ridden that day. Data indicating the interactions (e.g., the guest has been on two particular rides) may be stored in a database as guest data related to the particular user ID.

As previously discussed, the game play hub (e.g., a gaming platform) may include an interface that uniformly displays available games, archived games, top-rated games, and so forth, such that the organization of the games is uniform or approximately uniform for each guest or user. That is, the game play hub displays the games without considering unique data associated with the guest, such as data indicating guest preferences. By way of example, a first guest may prefer to play horror themed games while a second guest may prefer to play racing themed games. Additionally, the first guest may be older and play more often than the second guest. As such, the first guest and the second guest may spend substantial time searching through a list or stepping through multiple web pages to find the respective games of interest.

Moreover, both the first guest and the second guest may attend an amusement park associated with the game play hub (e.g., owned by same entity). Their selected interactions at the amusement park may be different. By way of example, the first guest may attend an annual Halloween event at the amusement park while the second guest may visit the park every month and spend a majority of the time in a particular area (e.g., a car themed zone) of the amusement park. Similar to the uniformly organized games on the display interface of the game play hub, the amusement park may also include interactions that are uniform for guests. That is, the amusement park features or interactions may be the same for each guest regardless of their preferences. Thus, such interactions may not be perceived as responsive or personalized to the guest.

Furthermore, since the guests may access both the game play hub and the amusement park, the data in each entertainment setting may be pertinent to each other. For example, the attendance of the first guest at the Halloween event may indicate a preference for spooky or horror themed entertainment. As such, the game play hub may use this information to organize games and/or theme aspects of the game play hub accordingly. As such, it may be desirable to integrate data from the game play hub and the amusement park to learn about the guest, and use this information to modify organization of the games on the interface of the game play hub and/or modify interactions at the amusement park. By integrating the data, the game play hub and the amusement park may avoid a series of lengthy questionnaires that may otherwise be used to obtain the same guest information in each entertainment setting. Additionally, since the game play hub and the amusement park may be related, it may be desirable to provide a single platform (e.g., portal) that allows the user to view, edit, and/or supplement data related to guest activity in the game play hub and the amusement park.

It should be noted that although examples provided herein may be specifically directed to particular aspects of a game play hub and an amusement park, such as to facilitate a modified (e.g., customized) organization of games and account information on the game play hub and/or modified interactions at the amusement park, the techniques in this disclosure may be applied to other conditions and/or contexts. Thus, the present examples should be understood to reflect real-world examples of a game play hub and/or an amusement park to provide useful context for the discussion, and should not be viewed as limiting further applicability of the present approach. For example, the present disclosure should be understood as being applicable to additional situations in which customizing objects displayed on an interface and/or customizing interactions may be utilized to facilitate teaching (e.g., instruction regarding park operations, game operations, or employee duties).

With the foregoing in mind, FIG. 1 is a schematic diagram of a game play hub 10. The game play hub 10 may include one or more gaming portals and may be accessed through a guest-facing display interface 11, such as a webpage or a mobile application on a display. As will be described in detail herein, the display interface 11 (e.g., guest-facing display interface) may include visual and/or selectable components that allow a guest (e.g., a user) to interact with the game play hub 10. The display interface 11 may display organized games as well as guest information. The guest information may include a unique user identification (ID) 12, a play score 18, and/or account related information, which includes an account tab 14 and a notification tab 16.

The user ID 12 (e.g., 10359) may include a unique combination of letters, numbers, and/or characters that identifies a guest profile associated with the guest. The guest may select the user ID 12 and/or the game play hub 10 may assign the user ID 12 so long as the user ID 12 is available (e.g., not presently used by another guest). Accessing the game play hub 10 using the user ID 12 rather than personal identifiable information (PII) may protect the identity of the guest. The game play hub 10 may store guest data (e.g., in one or more databases) and tag it with the user ID 12, such that the game play hub 10 and/or the amusement park may retrieve the guest data using the unique user ID 12. By way of example, the guest data may include tracked guest activity (e.g., tracked guest game activity) for the user ID 12 within the game play hub 10, such as tracking games played, game scores, access frequency, etc. Additionally or alternatively, and as will be described with respect to FIG. 7, an amusement park associated with the game play hub 10 may also store guest data and tag it with the user ID 12. As another example, the amusement park may track guest activity (e.g., tracked guest park activity) for the same user ID 12 within the amusement park, such as duration of park visit, rides accessed, zones accessed, etc. Moreover, in some instances, the game play hub 10 may also pull data from third-party applications associated with the guest and tag it with the user ID 12 prior to storing it as guest data.

The game play hub 10 and/or the amusement park may retrieve the guest data using the user ID 12, and use the guest data to modify interactions to be unique for the guest. In this manner, the game play hub 10 may curate guest related information from both activity on the game play hub 10 and at the amusement park, as well as from third-party applications.

The play score 18 (e.g., 5,000 points) may include a metric for gauging the guest's playing performance for one or more games. Although the following descriptions describe the play score measured in points, the systems and methods described herein may include a play score measured in coins, tokens, skill level (e.g., beginner, intermediate, expert), and so forth. Additionally, although the following descriptions describe a single play score 18, the systems and methods described herein may include one or more play scores 18 correlating to one or more games. In some embodiments, the guest may earn points based on, but not limited to, successfully passing a level within a particular game, unlocking features within the particular game, and/or playing on the game play hub 10 for a particular number of days within a particular duration (e.g., one week, one month, one year, and so forth). In some embodiments, the play score 18 may include the score of a game actively played and/or a total play score 18 for all games played within a time frame (e.g., since the user activated an account for the game play hub 10). Moreover, the play score 18 may be publicly displayed to some guests (e.g., each guest presently playing the same game as the guest) or each guest of the game play hub 10, such as for competitions within the game play hub 10. Additionally, or alternatively to earning points based on activity within the game play hub 10, the guest may earn points based on activity at the amusement park. By way of example, the guest may earn points by visiting certain rides associated with a game recently played. The guest may also redeem the points for merchandise, gift cards, tickets, and so forth, at the amusement park and/or within the game play hub 10.

The account tab 14 and the notification tab 16 may be selectable tabs that upon selection (e.g., by clicking using a computer mouse or tapping on a touch screen), the game play hub 10 opens a new window on the display interface 11. Although the following descriptions describe two account related information tabs, the systems and methods described herein may include one or more account related information tabs (e.g., three, four, five, and so forth) corresponding to subcategories of the account related information. In some embodiments, the account tab 14 and the notification tab 16 and/or the data associated with the account tab 14 and the notification tab 16, may be integrated into a single tab. Additionally, or alternatively, the display interface 11 may display guest related information on the main display interface 11 along with the organized games (e.g., no tabs). Briefly, and as will be described in detail with respect to FIG. 2, the account tab 14 may include account-related information including, but not limited to, the user ID 12, an associated email address, a guest name or a screenname (e.g., different than the user ID 12 used for accessing the account on the game play hub 10), a history of games played (e.g., since the guest created the account and/or within a particular duration (e.g., six months, one year, five years, and so forth)), and/or a history of play scores associated with the games.

Briefly, and as will be described in detail with respect to FIG. 3, the notification tab 16 may include notifications indicating a history of guest activity or information associated with the guest activity. By way of example, the notifications may include a history of the play score 18 (e.g., the play score 18 at present day and at the same time last year) and/or a history of associated guest activity at the amusement park (e.g., an event ticket purchased the same time last year). In some embodiments, the notifications may include additional questions or requests based on the history. That is, rather than the game play hub 10 requesting generic information, the game play hub 10 may tailor questions to the game history and/or amusement park activity specific to the user ID 16. By way of example, the notification tab 16 may request information related to fears based on a notification indicating that the guest associated with the unique user ID 16 has purchased a ticket for an upcoming Halloween event at the amusement park. The notification tab 16 may request the same information based on a notification that the guest recently played a horror themed game.

As will be described in detail with respect to FIG. 4, the game play hub 10 may communicate with third-party applications programming interfaces (APIs) that allow the game play hub 10 to communicate with the third-party applications. Specifically, the APIs may function as intermediaries that send a request from the game play hub 10 to the third-party applications (e.g., third-party systems), receive the information back from the third-party applications, and deliver the information back to the game play hub 10. In this manner, the game play hub 10 may access third-party information that may not be available otherwise through the game play hub 10. The guest may enable or disable the game play hub 10 from accessing such data, for example, through the account tab 14 or a device setting (e.g., used to access the game play hub 10). By way of example, the game play hub 10 on a mobile application may access third-party applications on the mobile device, such as social media applications, medical applications, bank applications, and so forth, upon the guest granting access. The game play hub 10 may use such information to learn about the guest. The third-party data may indicate preferences including, but not limited to, favorite animals, favorite amusement park character, preferred name, medical conditions, physical disabilities, and/or information related to family members of the guest. Based on this data, the game play hub 10 may recommend games and/or rides, automatically populate answers or recommend answers for questions asked in the notification tab 16, and so forth. In this manner, the game play hub 10 may determine preferences using the account tab 14, the notification tab 16, third-party applications, tracked guest game activity, and/or tracked guest park activity. As will be described herein, the game play hub 10 may use the accumulation of data from the various sources, integrate the data to determine guest preferences and information, and use this guest data to customize the display interface 11 for the particular guest and/or customize interactions at the amusement park.

In the depicted embodiment, the display interface 11 displays multiple games organized by a commonality or topic. In the depicted embodiment, the display interface 11 displays a default organization, and as will be discussed in detail with respect to FIG. 7, the organization may be modified based the guest data. Although the following discussions describe game topics including recommended games, popular games, and archived games, which represents a particular embodiment, the systems and methods described herein may include other game topics (e.g., best games by categories or themes, suggested by age group or gender, etc.). Here, the games are organized by topics of recommended games 20, popular games 22, and archived games 24. The recommended games 20 may include a set of recommended games 26 including a first game (e.g., Game 1), a second game (e.g., Game 2), and a third game (e.g., Game 3), within an organized list of games. In some embodiments, the recommended games 20 may include games most often played within a particular duration (e.g., on the particular day), the popular games 22 may include a set of games 28 most often played to date, and the archived games 24 may include a set of games 30 previously played but without game data (e.g., game icon stays in library after game data is deleted).

The display interface 11 may display a particular number of games within each topic (one, three (shown), five, and so forth). Within the topic, the guest may continue to browse (as indicated by ellipsis) for the next most relevant games (e.g., a fourth game, a fifth game, and so forth). Moreover, the position of the game placement, such as from left to right, may indicate a level of relevance. By way of example, the first game of the set of recommended games 26 at the left most position may include the most recommended game while the third game may include the third most recommended of the recommended games 20. The game play hub 10 may organize the popular games 22 and the archived games 24 similarly.

Figure 2:
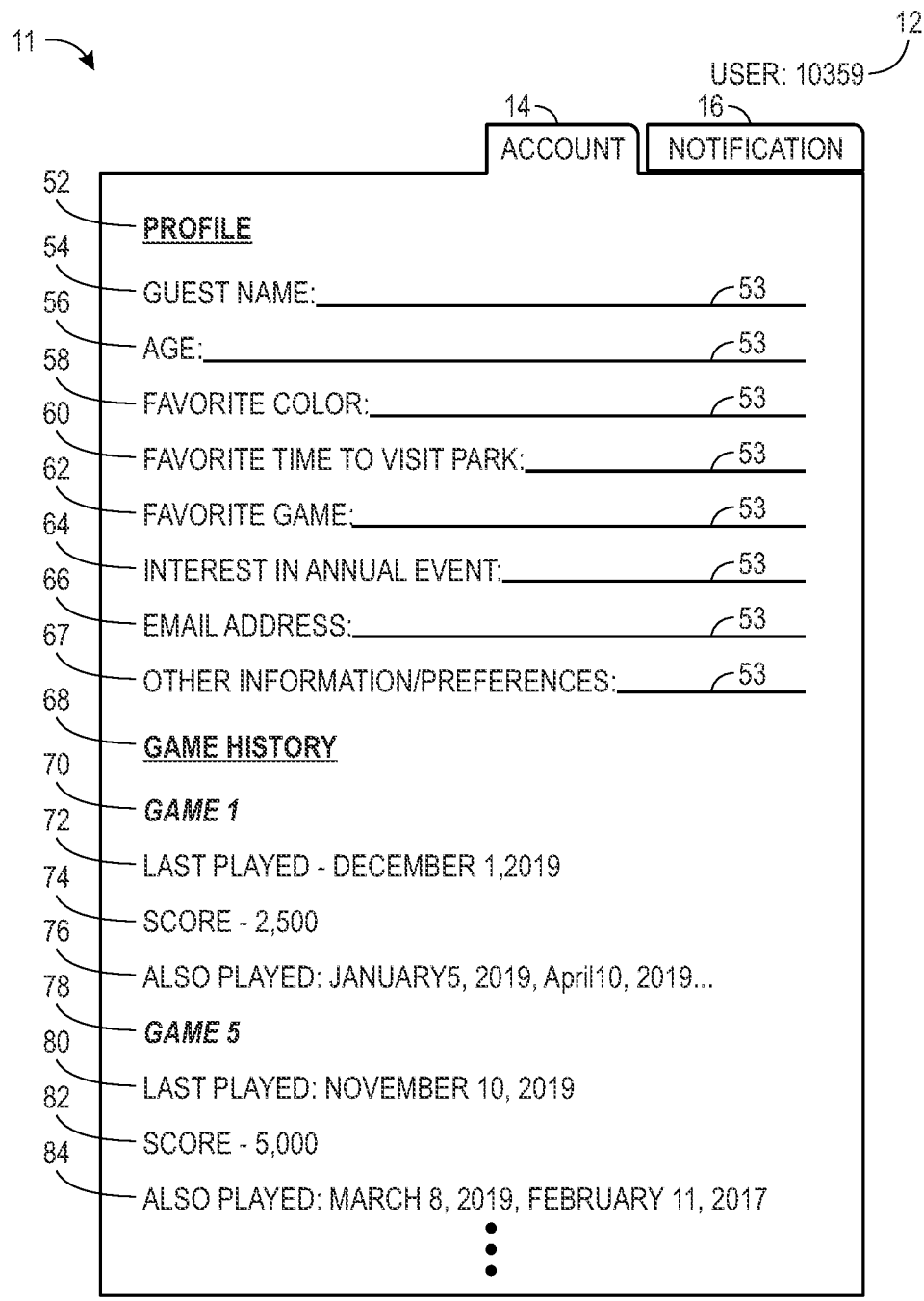
FIG. 2 is a schematic diagram of an account page of a guest-facing interface of the game play hub of FIG. 1, in accordance with an embodiment of the present disclosure.

FIG. 2 illustrates a schematic diagram of the account tab 14 on the display interface 11. As previously mentioned, the account tab 14 includes general information and/or preferences associated with the guest corresponding to the user ID 12. The general information related to the user ID 12 may be organized by a user profile 52 and a game history 68. As previously mentioned, the display interface 11 is guest-facing and interactive. Thus, the editable fields 53 under the profile 52 and the game history 68 may allow the guest to input information. In the depicted embodiment, the profile 52 includes a guest name 54, an age 56, a favorite color 58, a favorite time to visit the park 60, a favorite game 62, an interest in an annual event 64, an email address 66, and other information or preferences 67 that the guest may choose to share with the game play hub 10.

The game history 68 may include games played by the guest since creating an account with the game play hub 10. In the depicted embodiment, the game history 68 shows a history for a first game 70 (Game 1) and a second game 78 (Game 5). In particular, for the first game 70, the game history includes a first game last played date 72 (e.g., Dec. 1, 2019), a first game score 74 (e.g., 2500), and a first game also played date 76 (e.g., Jan. 5, 2019 and Apr. 10, 2019). For the second game 78, the game history includes a second game last played date 80 (e.g., Nov. 10, 2019), a second game score 82 (e.g., 5,000), and a second game also played date 84 (e.g., Mar. 8, 2019 and Feb. 11, 2019).

The account tab 14 may include additional general information and/or preferences associated with the user ID 12 (as indicated by ellipsis). For example, the additional general information may be automatically generated based on additional information learned about the guest, such as from information provided by the guest through the notification tab 16. Since the display interface 11 is guest-facing and interactive, the fields 53 are editable and may be manually changed by the guest. In some embodiments, the game play hub 10 may automatically populate the fields 53 (e.g., using machine learning) and the guest may change the text, if necessary. By way of example, the game play hub 10 may automatically populate the favorite time to visit park 60 based on the guest visiting the park often during a particular season or month. However, the guest may prefer to visit during a different time and as such, may manually input the correct information. To accurately determine guest preferences that may be used to modify the display interface 11, the game play hub 10 may request additional information associated with the guest.

Figure 3:
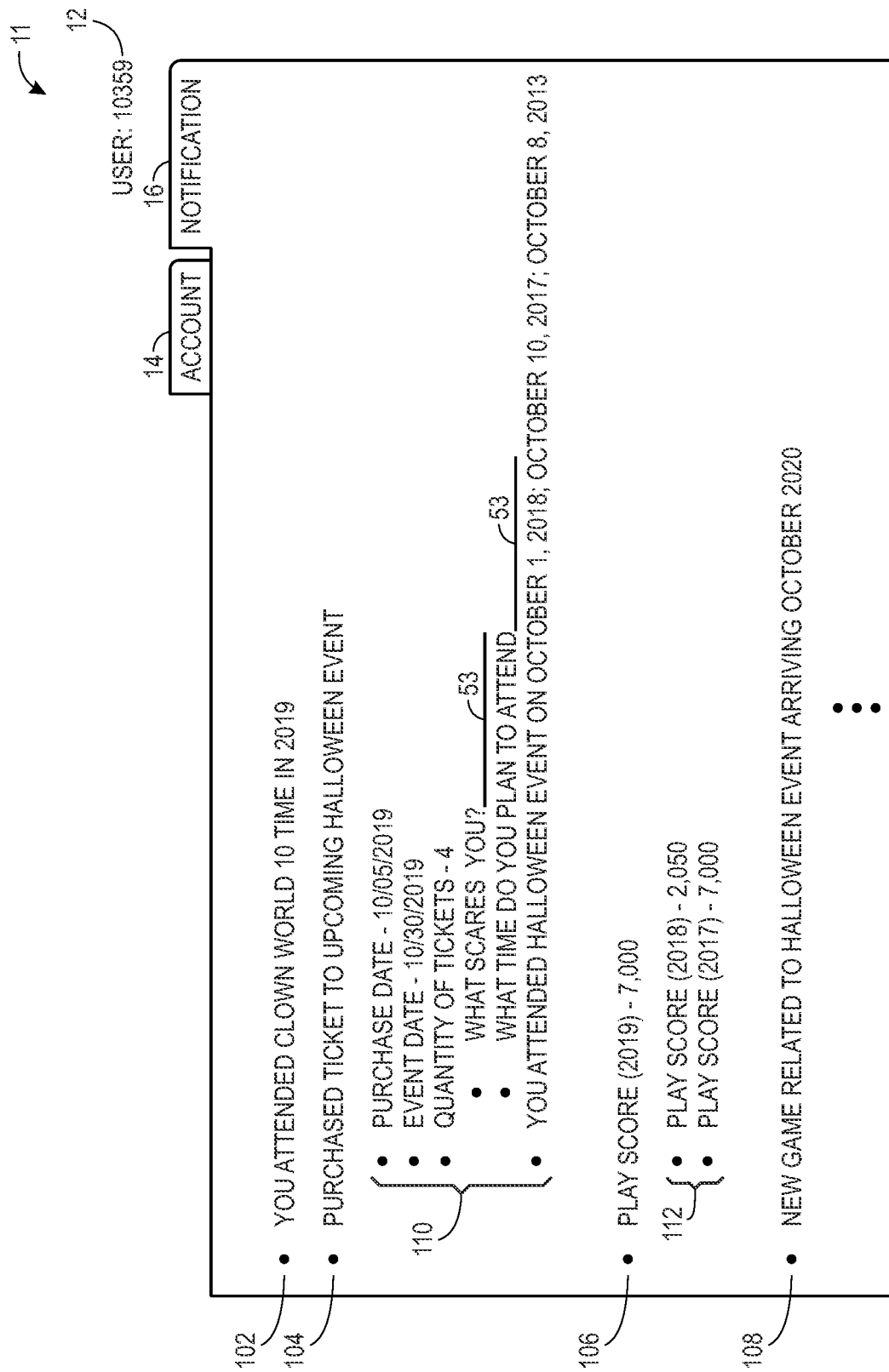
FIG. 3 is a schematic diagram of a notification page of the guest-facing interface of the game play hub of FIG. 1, in accordance with an embodiment of the present disclosure.

To illustrate, FIG. 3 depicts a block diagram of the notification tab 16 on the display interface 11. As previously discussed, the notifications may be based on guest data from the game play hub (e.g., tracked guest game activity), information from the account tab 14, guest data from the amusement park (e.g., tracked guest park activity), and/or data from third-party applications. Here, the notifications include a first notification 102 (you attended clown world 10 times in 2019), indicating that the guest attended clown world in 2019. The notifications also include a second notification 104 (purchased ticket to upcoming Halloween event), indicating that the guest purchased a ticket to an upcoming Halloween event at the amusement park. The notifications also include a third notification 106 (play score (2019)—7,000), indicating an accumulated play score of 7,000 in the year 2019. Additionally, the notifications include a fourth notification 108 (new game related to Halloween event arriving October 2020), indicating that a new game that may be of interest to the guest is arriving in October 2020.

In some embodiments, the notifications may include sub-information 110, which includes sub-notifications and/or questions related to the notifications. In the depicted embodiment, the second notification 104 indicating that the guest purchased a Halloween event ticket includes sub-information 110 indicating the purchase date of Oct. 5, 2019, the event date of Oct. 30, 2019, a quantity of four total tickets purchased, and a history of past Halloween events attended by the guest (e.g., You attended Halloween event on Oct. 1, 2018, Oct. 10, 2017, and Oct. 8, 2013).

Based on the information associated with this sub-information 110, the game play hub 10 may request additional information from the guest related to second notification 104 and/or the sub-information 110. Since the second notification 104 is generally associated with a ticket for the Halloween event, the game play hub 10 requests additional information related to the Halloween event, such as an indication of fears (e.g., what scares you?) and the ticket, such as an expected attendance time on the event date (e.g., what time do you plan to attend?). The display interface 11 may include fields 53 to interact with the guest and receive input for these questions. In additional embodiments, in response to the guest input, the game play hub 10 may request additional information based on the input. That is, the display interface 11 may be dynamic and the game play hub 10 may provide narrowly tailored questions for the guest to answer based on an answer to a previous question. Similarly, the third notification 106 includes sub-information 112, and the game play hub 10 may request additional information from the guest related to the third notification 106 and/or the sub-information 112.

In this manner, the game play hub 10 may learn detailed information about the guest to facilitate modifying the organization of game play content on the display interface 11 and/or interactions at the amusement park to be unique to the specific guest. Rather than asking various preliminary questions (e.g., do you plan to attend any events at the amusement park this year?), the game play hub 10 uses data acquired from various sources (e.g., a history of games played on the game play hub 10, the account tab 14, data from the amusement park, and third-party systems) to ask narrowly tailored questions to determine guest preferences and/or additional information about the guest. Thus, there may be a series of questions that may be automatically fulfilled using the contextual information to efficiently determine the narrowly tailored questions. The notification tab 16 may also include additional general information and/or preferences associated with the user ID 12 (as indicated by ellipsis).

Figure 4:
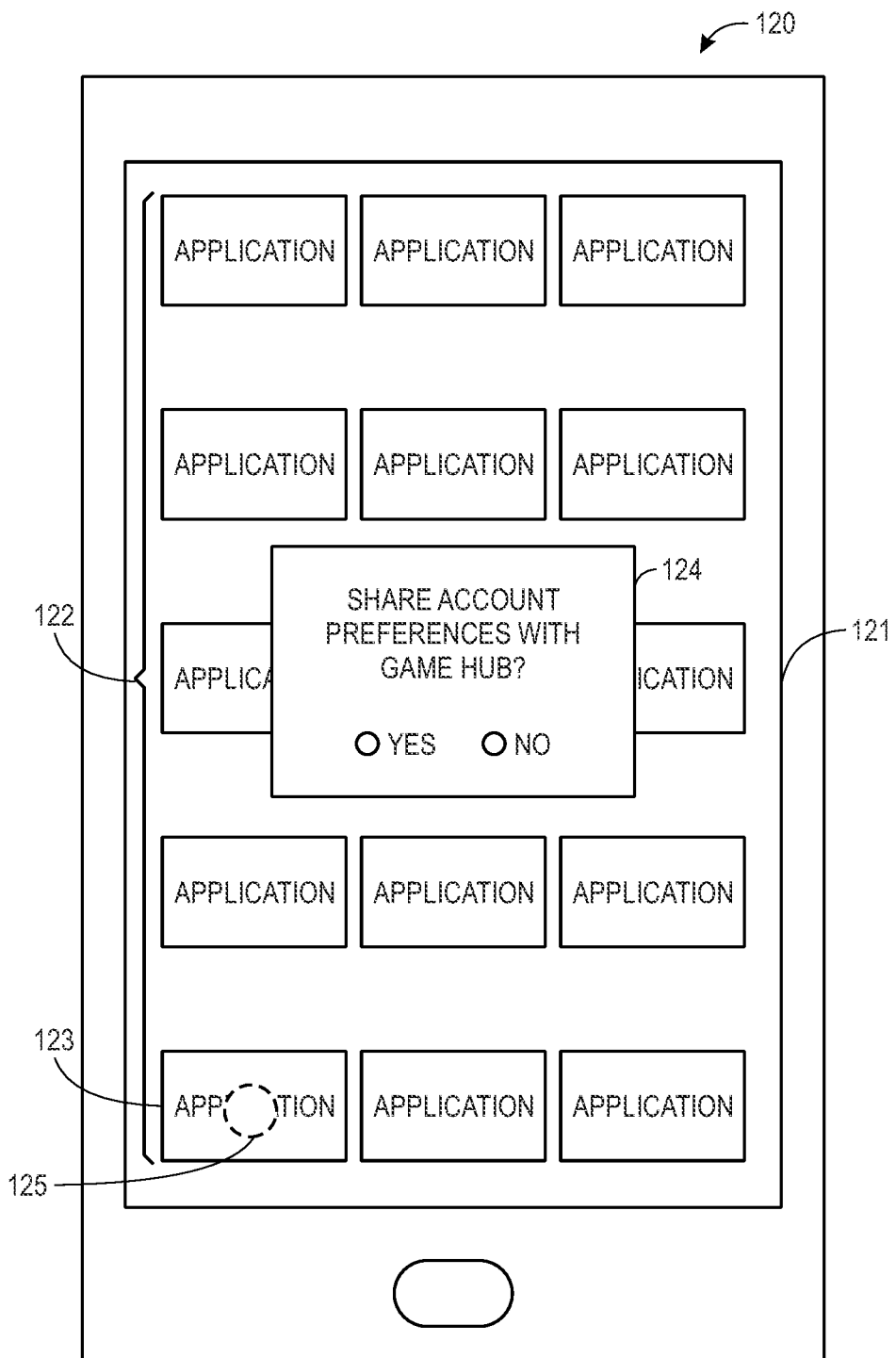
FIG. 4 is a schematic diagram of a dialog box to enable sharing third-party application data with the game play hub of FIG. 1, in accordance with an embodiment of the present disclosure.

FIG. 4 is a schematic diagram of a dialog box 124 on the display interface 121 of a guest mobile device 120 that enables sharing data from third-party applications. The guest may access the game play hub 10 through a mobile application on the guest mobile device 120. The display interface 121 may display one or more mobile applications 122, including a game play hub mobile application 123. As shown, the dialog box 124 may appear on a home screen of the guest mobile device 120 upon selection 125 of the game play hub mobile application 123. The dialog box 124 may prompt the user to grant or deny access for the game play hub 10 (e.g., via the game play hub mobile application 123) to communicate with the third-party applications (e.g., social media applications, medical applications, bank applications, etc.) on the guest mobile device 120 through third-party APIs. In additional embodiments, the guest may grant or deny access for the game play hub 10 to third-party applications on the guest mobile device 120 through settings on the guest mobile device 120, within the game play hub 10, and/or on a different screen of the display interface 121. In some embodiments, the guest may grant access to some third-party applications while denying access to other third-party applications. Additionally or alternatively, the guest may allow the game play hub 10 access to other information stored or accessible from the guest mobile device 120, such as photos (e.g., stored on memory of the guest mobile device 120 and/or in a cloud computing system) and a global positioning system (GPS). The guest may also set notification time and date preferences, such as a time frame to receive the notifications. Thus, the game play hub 10 may access as much available information as the guest enables the game play hub 10 to access.

In some instances, the game play hub 10 may determine that the guest data acquired from the third-party applications is reliable (e.g., within a threshold of reliability). By way of example, the game play hub 10 may communicate with a social media application through the third-party APIs to determine that the guest has a family of four people, one of which is a child. The game play hub 10 may not request additional information based on reliability of the social media application and/or data from other sources confirming that the information from the social media application (e.g., the sub-information 110 indicating that four tickets were purchased, likely for the family of four) is correct. In additional embodiments, the game play hub 10 may request more information related to the guest information from the social media application. By way of example, the game play hub 10 may ask the guest the child's name and/or permission for the amusement park to use the child's name for interactions at the amusement park.

In some embodiments, the guest may also control the extent of access granted to third-party applications and other information on or accessible via the guest mobile device 120. For example, the guest may control settings on the guest mobile device 120 or provide (e.g., input) additional preference based information through the other information or preferences 67 of FIG. 2, such as a preference to stop tracking the guest when the guest enters a particular zone of the amusement park (e.g., deny access to GPS), request limited interactions with an animated character in a particular part of the amusement park or during a particular time of day, indicate clothing (e.g., color of clothing) to be worn during next visit to the amusement park, and so forth. Thus, by the game play hub 10 accessing permitted data sources or received preference information, the game play hub 10 avoids requesting answers to preliminary questions (e.g., how many members are in your household?).

Figure 5:
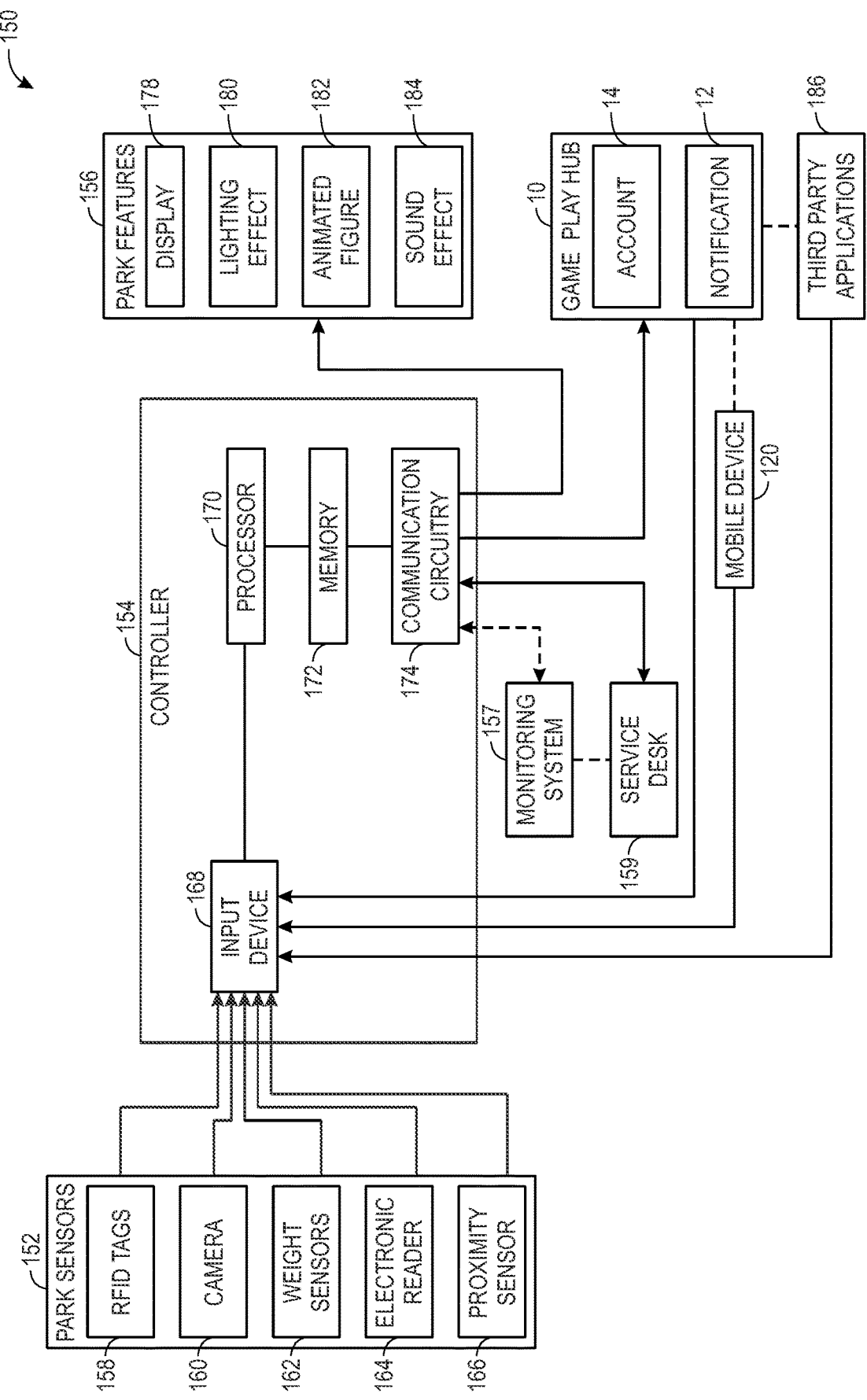
FIG. 5 is a block diagram of a game play hub system for modifying the guest-facing interface and guest interactions at an amusement park, in accordance with an embodiment of the present disclosure.

To illustrate the system controlling the game play hub 10 and/or the amusement park, FIG. 5 depicts a game play system 150 for modifying the game play content on the game play hub 10 and/or interactions at the amusement park. As shown, the game play system 150 includes park sensors 152, a controller 154, park features (e.g., attraction features) 156, the game play hub 10, a guest mobile device 120, and third-party applications 186. It should be understood that the illustrated system is merely intended to be exemplary, and that certain features and components may be omitted and various other features and components may be added to facilitate performance, in accordance with the disclosed embodiments.

The controller 154 may include an input device 168, a processor 170, a memory 172, and a communication circuitry 174. The input device 168 may receive input data from the park sensors 152, the game play hub 10, the third-party applications 186, and the guest mobile device 120. Although the following discussions describe the game play hub 10, the third-party applications 186, and the guest mobile device 120 as separate components of the game play system 150 that provide data to the input device 168, these components may instead be integrated into or communicate with (as indicated by the dash-dot lines) the game play hub 10. Based on the input data received at the input device 168, the controller 154 may modify the game play content on the game play hub 10 and/or interactions (e.g., features) at the amusement park, as previously discussed.

In the amusement park setting, the controller 154 may control the park features 156, which includes a display 178, a lighting effect system 180, an animated figure 182, and/or a sound effect system 184. The amusement park may include attractions throughout the amusement park, such as rides, virtual game rooms, picnic areas, restaurants, and so forth, that may include one or more of the park features 156. By way of example, a ride may include the lighting effect system 180, the animated figure 182, and/or the sound effect system 184, while a pathway at the amusement park may include the animated figure 182 and the display 178. Moreover, the amusement park may be divided into multiple zones organized by themes and/or age group. By way of example, a zone organized by a particular theme may include a heavier focus or revolve around a particular subject associated with a theme.

Figure 7:
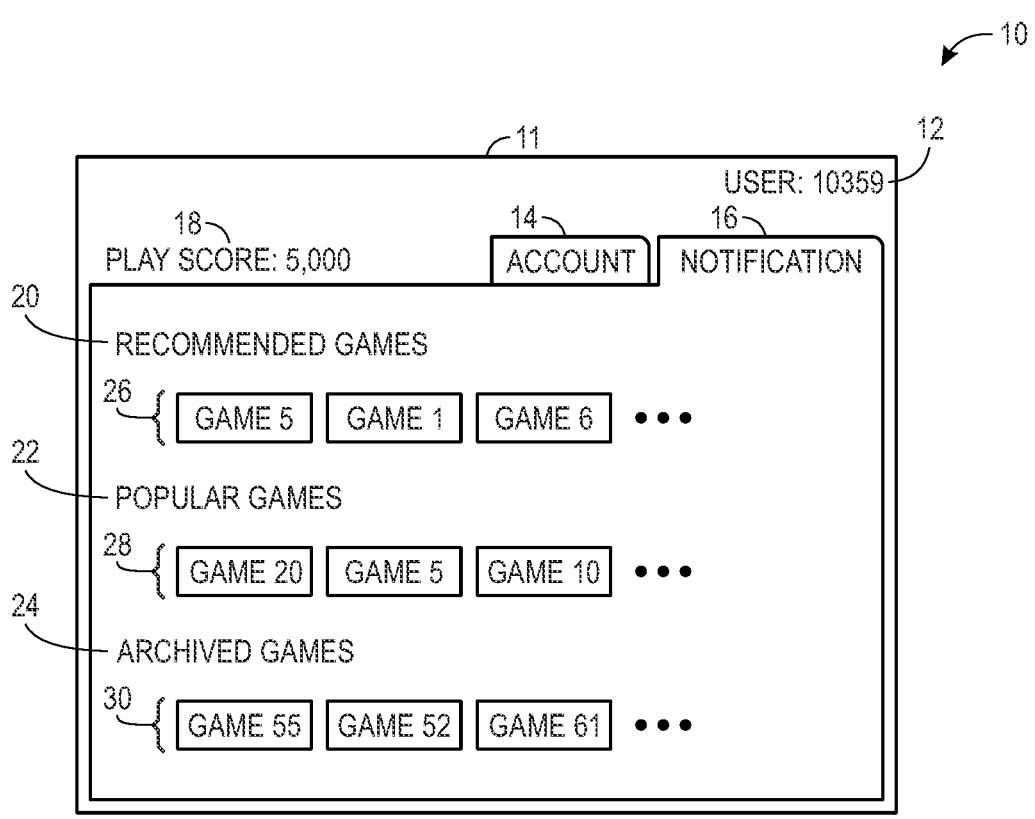
FIG. 7 is a schematic diagram of the game play hub with a modified guest-facing interface, in accordance with an embodiment of the present disclosure.

As will be discussed in detail with respect to FIG. 7, the controller 154 may control the park features 156, for example, to provide customized interactions for the guest. By way of example, the controller 154 may control a speaker of the sound effect system 184 on a ride to produce audio associated with the particular guest. For example, the audio may include recognizable and unique sounds (e.g., a favorite song) and/or the guest's name. The modified (e.g., customized) audio may be based on the guest data. As another example, the controller 154 may control the lighting effect system 180 to project specific animations during a ride (e.g., on a ride tunnel wall) based on the guest data. For example, the game play system 150 may retrieve guest data from the game play hub 10 that indicates the guest's fears, and use this data to modify animations projected by the lighting effect system 180 (e.g., project spiders since guest is afraid of spiders). In this manner, the controller 154 may control and modify amusement park interactions to provide a customized experience based on the guest data. Specifically, guest presence on or near the park features 156 may trigger the controller 154 to modify the park features 156 based on the guest data. The game play system 150 may detect the guest using one or more of the park sensors 152.

The park sensors 152 may include one or more radio frequency identification (RFID) tags 158, one or more cameras 160, one or more weight sensors 162, one or more electronic readers 164, and/or one or more proximity sensors 166. The park sensors 152 may be placed or positioned in areas where the guest presence is expected, such as on a ride cart or a ride track of a ride. The RFID tags 158 may communicate with the electronic readers 164 to indicate a presence of the guest. In particular, the RFID tags 158 may be incorporated on a ride, such as on the ride track or the ride cart of the ride (e.g., inside, on the side, or on the entryway of the ride cart). Thus, the electronic readers 164 may be placed in a manner that allows scanning of the RFID tag 158. By way of example, an electronic reader 164 may be placed on the ride track so that the electronic reader 164 scans the RFID tag 158 on the ride cart as the ride cart passes over the electronic reader 164, indicating that the guest is on the ride. In some embodiments, the RFID tags may include guest-wearable RFID tags 158 that are associated with particular user IDs 12. Thus, the input data from an electronic reader 164 may indicate that a guest associated with a user ID 12 is present upon scanning the guest wearable RFID tag 158. Subsequently, the controller 154 may retrieve the guest data based on the user ID 12 and modify the park features 156 accordingly.

As previously mentioned, the amusement park may also track guest park activity, such as ride history, interactions, and so forth. By way of example, the tracked guest park activity (e.g., the guest-wearable RFID tag 158) may indicate that the guest stayed in a specific zone of the amusement park for the majority of the visit. The tracked guest park activity may also indicate that the guest was on a particular ride more often than other rides. Based on this guest data, the game play system 150 may determine preferences for the guest (e.g., favorite zone and ride at the amusement park) and use it to update game play content on the game play hub 10 and/or interactions at the amusement park. By way of example, the game play system 150 may cause the display interface 11 of the game play hub 10 to recommend games associated with the preferred zone and/or ride.

In additional embodiments, the cameras 160 may be placed or positioned in areas based on where guest presence is expected, such as to view the ride cart on the ride. The camera 160 may determine the presence of the guest based on images or video captured by the cameras 160. Specifically, the cameras 160 may perform facial recognition and/or body recognition to determine the presence of the guest. In some embodiments, the camera 160 may instead provide the images and/or video as input data to the controller 154, which may subsequently perform the facial recognition and/or body recognition. Moreover, in some embodiments, the controller 154 may identify the particular guest based on the input data. That is, the controller 154 may match the images and/or video to an image of the guest. The image of the guest may be one that is stored in the memory 172 and associated with the user ID 12 and/or retrievable through the third-party applications 186 (e.g., guest profile picture on social media application).

Additionally or alternatively, the weight sensors 162 may indicate presence of the guest. The weight sensors 162 may be mounted on the ride tracks and may indicate presence of the ride cart on the ride tracks based on a predetermined weight. Similarly, the proximity sensors 166 may be placed or positioned proximate to areas where guest presence is expected. The proximity sensors 166 may detect a presence of nearby objects without physical contact by using electromagnetic fields, light, and/or sound. The proximity sensors 166 may emit an electromagnetic field or a beam of electromagnetic radiation (e.g., infrared) and look for changes in the field or return signal. To accurately detect the presence of the nearby object as a guest, the proximity sensors 166 may be positioned near a loading point for the ride cart and/or on a ride cart seat. In general, the RFID tags 158 and/or the cameras 160 may be used alone or in conjunction with other park sensors 152 (e.g., weight sensors 162 and/or proximity sensors 166) to detect the presence of the guest and/or to identify the guest.

The game play hub 10 may also provide input data to the input device 168, including data from the account tab 14 (e.g., guest name 54) and/or the notification tab 16 (e.g., guest fears). That is, as discussed with respect to FIGS. 2-4, the game play hub 10 may provide guest data, such as tracked guest game activity in the game play hub 10, the guest's preferences based on data determined using the various data sources, and/or answers to questions asked in response to the notifications.

Additionally, or alternatively, the third-party applications 186 may provide input data to the input device 168. That is, upon guest permission, the third-party applications 186 may be enabled to share data with the game play system 150. The third-party applications 186 may include systems associated with third-parties, which include entities that do not have a direct relationship with the game play system 150. The third-party applications 186 may provide third-party data from one or more third-parties, collected through their websites, mobile applications, and/or other platforms. As previously mentioned, the third-party applications 186 may include, but are not limited to, social media applications, medical applications, and/or bank applications. Thus, third-party data from the third-party applications 186 may include data associated with the social media applications, medical applications, and/or bank applications.

The guest mobile device 120 may also provide input data to the input device 168. Upon permission from the guest, the guest mobile device 120 may be enabled to share device data with the game play system 150. The device data may include, but is not limited to, images and videos stored on or accessible to the guest mobile device 120, a GPS location of the guest mobile device 120, tracking data determined by the guest mobile device 120 (e.g., steps taken per day, average screen time, etc.), and/or setting preferences (e.g., larger text, color theme, special accessibility features enabled, etc.).

The game play system 150 includes a monitoring system 157 and a service desk 159. Although the following discussions describe the monitoring system and service desk as separate components of the game play system 150, these components may communicate with each other (e.g., as indicated by the dash-dot line) or be integrated into a single system (e.g., the service desk 159 is part of the monitoring system 157). The monitoring system 157 may be an administrative system that monitors the park sensors 152, the park features 156, and the game play hub 10. For example, the monitoring system 157 may monitor control signals to change the park features 156 sent from the controller 154 in response to the presence and identification of the guest. In particular, the monitoring system 157 may ensure that the park sensors 152, the park features 156, and the game play hub 10 function as expected and/or provide the modified features as expected for the particular guest. In some embodiments, the monitoring system 157 may also track wait times or queues for the rides to maintain an expected throughput.

Additionally, if the controller 154 is not functioning as expected (e.g., erroneous control signals), the monitoring system 157 may control or reconfigure the controller 154. In this manner, the monitoring system 157 may reset or recalibrate the park sensors 152, the park features 156, and the game play hub 10, and/or override a display or organization of game play content and/or modified park features 156 for the particular guest (as originally determined by the controller 154). The monitoring system 157 may reset the modified game play content and/or modified interaction algorithms of the controller 154. In certain embodiments, the monitoring system 157 and the controller 154 may be implemented as a single controller.

In some embodiments, the service desk 159, which may include human or virtual service agents, may manually stop the modified game play content and/or modified interactions via a stopping mechanism (e.g., button) to override control signals from the controller 154 if the service desk 159 finds any issues with the modified game play content, the game play hub 10, the modified interactions, and/or the park features 156 beyond those determined by the controller 154. Since the guest may be tracked, as previously discussed (e.g., via guest-wearable RFID tags 158), the service desk 159 may monitor activity of the guest and use it to address unexpected delays or unexpected functions at the amusement park. By way of example, the tracked activity may indicate that the guest attempted to ride a particular roller coaster but was stationary or approximately stationary at the roller coaster zone for a particular duration beyond a threshold duration, indicating an unexpected delay or queues and/or unexpected performance by the roller coaster. In some embodiments, the unexpected activity may alert the service desk 159 to resolve the issue.

The controller 154 may enable the communication circuitry 174 to interface with various electronic devices, such as the monitoring system 157, the service desk 159, the game play hub 10, and/or the park features 156. The monitoring system 157 and/or the service desk 159 may communicate with the controller 154 to receive and/or send information (as indicated by double-headed arrow) to ensure that the game play hub 10 and/or the park features 156 are operating as expected. Additionally, or alternatively, the controller 154 may enable the communication circuitry 174 to interface with components of the park features 156. For example, the communication circuitry 174 may allow the controller 154 to communicatively couple to a network, such as a personal area network (PAN), a local area network (LAN), and/or a wide area network (WAN). Accordingly, in some embodiments, the controller 154 may process data from the input device 168, determine presence of and identify a particular guest, determine guest data associated with the guest from the respective user ID 12, determine modifications to game play content, determine modifications to interactions at the amusement park to facilitate customized experiences for the guest, and communicate the modifications to the game play hub 10 and/or the park features 156 via the communication circuitry 174. For example, after processing sensor data from the input device 168, the processor 170 may determine a control signal that enables the communication circuitry 174 to wirelessly transmit control data to the game play hub 10 and/or the park features 156 to enable activation of the modifications. In other embodiments, the communication circuitry 174 may be connected via a wired connection to the game play hub 10 and/or the park features 156.

The processor 170 may include one or more processing devices that receive input signals from the input device 168 relating to the presence and/or identification of the guest, which may then be used to determine a modified game play content for the game play hub 10 and/or modified interaction of the park features 156, using techniques described herein. The memory 172 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired algorithms (e.g., program code) in the form of machine-executable instructions or data structures and which can be accessed by the processor 170 or by other processor-based devices. In particular, the processor 170 may include a processing core to execute machine-executable instruction algorithms stored in the memory 172. The processor 170 may also include processor-side interfaces for software applications running on the processing core to interact with hardware components on a ride associated with the processor 170, such as the display 178, the lighting effect system 180, the animated figure 182, and/or the sound effect system 184. The memory 172 may store guest data corresponding to tracked guest game activity and park activity, and the corresponding preferences of the guest (e.g., by manual input from the guest and/or as determined by processing an algorithm). The memory 172 may tag the guest data with the corresponding user ID 12 prior to storing it for subsequent retrieval. That is, the game play system 150 may retrieve data associated with the guest by looking up the ID 12 and using the associated guest data.

By way of example in the amusement park setting, the stored algorithms may include, but are not limited to, algorithms to determine the guest presence based on sensor data from the park sensors 152, identify the particular guest (e.g., by processing sensor data from the cameras 160 and performing facial recognition and/or processing sensor data from the RFID tag 158 that is associated with the user ID 12), retrieve guest data for the user ID 12, determine modifications to interactions within the park based on the guest data, and provide a modified image, sound, lighting effect, or animation (e.g., stored in the memory 172) based on the guest data (e.g., indicating preferences or guest information). In this manner, the controller 154 may determine the presence of the particular guest and control the park features 156 accordingly, for example, when the particular guest is within a predetermined range of the park features 156 and/or when the guest is determined to be oriented towards the park features 156. The modification to interactions may include modification to interactions on a ride, but may also include interactions on the park grounds.

In the game play hub 10 setting, the stored algorithms may include, but are not limited to, algorithms to authenticate login information (e.g., a username and a password combination), permit the guest to login to the game play hub 10, determine the user ID 12 associated with the login information, retrieve guest data for the user ID 12, determine that the guest logged on from a mobile application or a web browser, request guest data from third-party applications 186, request guest data from the mobile device 120, provide notifications to the notification tab 16, request additional information or confirmation of information on the account tab 14 and/or the notification tab 16, determine modification of game play content based on the guest data, and provide the modification of game play content. At least some of the modifications may include the organization of games, the order of games within categories or topics, the notifications and questions within the notification tab 16, and so forth.

Figure 6:
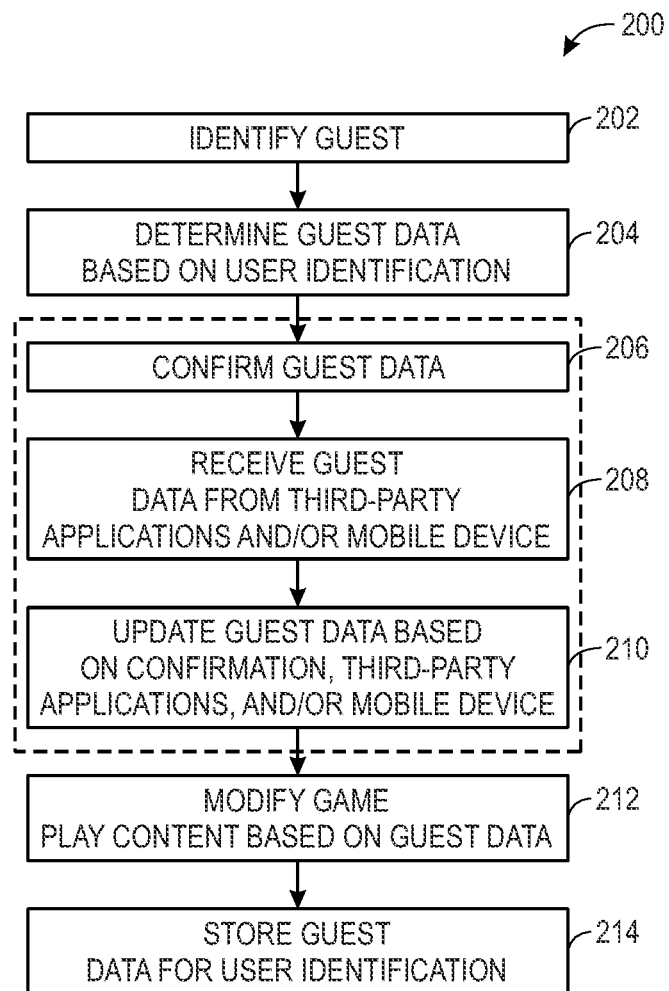
FIG. 6 is a process flow diagram for modifying the guest-facing interface of the game play hub, in accordance with an embodiment of the present disclosure.

To illustrate the process for providing modified game play content, FIG. 6 is a flow diagram of a process 200 for customizing game play content on the guest-facing display interface 11 of the game play hub 10. While the process 200 is described using acts in a specific sequence, it should be understood that the described acts may be performed in different sequences than the sequence illustrated, and certain described acts may be skipped or not performed altogether. In general, at least some of the steps of the process 200 may be implemented at least in part by the game play system 150 of FIG. 5. Specifically, these steps may be implemented at least in part by the processor 170 of the game play system 150 that executes instructions stored in a tangible, non-transitory, computer-readable medium, such as the memory 172. In alternative or additional embodiments, at least some steps of the process 200 may be implemented by any other suitable components or control logic, and the like.

To customize the game play content for the particular guest, the processor 170 may identify (process block 202) the guest. In particular, the processor 170 may identify a guest based on a user ID 12 associated with the guest account. The processor 170 may determine the user ID 12 upon the guest logging into the game play hub 10 to access the guest account. By way of example, the guest may login into the game play hub 10, as previously described, using a username and password. In some instances, the username and the user ID 12 may be the same. In other instances, the user ID 12 may not be the same as the username but may be associated with the username.

As such, after the guest logs into the game play hub 10, the processor 170 may determine (process block 204) guest data based on the user ID 12 associated with the login credentials. The guest data may include information associated with the guest (e.g., retrievable via the user ID 12) that indicates preferences and guest information. The guest data may include tracked guest game activity within the game play hub 10 (e.g., games played often, theme for games played, etc.) and/or tracked guest park activity at the amusement park (e.g., amusement park zone most often visited, rides most often ridden, attractions most often visited, etc.). In some embodiments, the guest data may be stored in the memory 172 and the processor 170 may retrieve the guest data using the user ID 12.

In some embodiments, to gather sufficient guest data, the processor 170 may optionally (as indicated by dash line box) confirm (process block 206) the guest data, for example, through the account tab 14 and/or the notification tab 16. As previously discussed with respect to FIG. 5, the processor 170 may determine the guest data through the game play hub 10 and/or the amusement park. By way of example, the guest data from the amusement park may indicate that the guest purchased a ticket for a Halloween event at the amusement park. To confirm or determine more preference based information about the guest, especially for providing customized interactions during the Halloween event, the processor 170 may request information related to the ticket purchased. As previously discussed with respect to FIG. 3, the processor 170 may confirm or request such information through the notification tab 16. In particular, the processor 170 may request additional information related to the Halloween event in the notification tab 16 to determine preference based information about the guest. For example, the processor 170 may request information related to fears of the guest in response to receiving guest data indicating that the guest purchased the Halloween event ticket.

Additionally or alternatively, the processor 170 may optionally (as indicated by dash line box) receive (process block 208) guest data from third-party applications 186 and/or the guest mobile device 120. As discussed with respect to FIG. 5, the guest may enable the game play system 150 to access or receive guest data from the third-party applications 186 and/or the mobile device 120. The guest data may include data associated with the guest on the third-party applications 186, such as data from social media applications, banking applications, medical applications, and other applications that may be on the same device as the game play hub 10 (e.g., the mobile device 120 as a mobile telephone). Additionally or alternatively, the processor 170 may receive the guest data from the mobile device 120 that indicates preferences, such as font or text size, favorite digital icon or images used to express an emotion in messages (e.g., a ghost icon), GPS, and so forth. In some embodiments, the guest may access the game play system 150 from a non-mobile telephone computing device, such as a web browser on a stationary computer, laptop, tablet, and so forth. In such embodiments, the processor 170 receives guest data from these devices upon the guest enabling the game play system 150 to receive their data.

After receiving the guest data from the third-party applications 186 and/or the mobile device 120, the processor 170 may update (process block 210) the guest data based on the confirmation, the third-party applications 186, and/or the mobile device 120. That is, if the confirmation, the third-party applications 186, and/or the mobile device 120 provide additional or different data than presently stored for the guest, the processor 170 may update the data and corresponding preferences for the guest. Based on the updated preferences, the processor 170 may modify (process block 212) the game play content that the guest may perceive as unique or customized for the guest.

In particular, the processor 170 may update the game play content on the guest-facing display interface 11 based on the guest data (e.g., originally retrieved guest data or updated guest data). To illustrate, FIG. 7 depicts a modified display interface 11 of the game play hub 10. As shown, and in contrast to the display interface 11 of FIG. 1 that provided a uniform display of games for guests, the multiple games are organized based on the guest data. That is, the game play content is modified for the guest based on the guest data indicating guest preferences.

The set of recommended games 26 of the recommended games 20 includes a fifth game, a first game, and a sixth game, within the organized list of games of the game play hub 10. Thus, rather than recommending the first game, the second game, and the third game as described with respect to FIG. 1, that may be based on games most often played by the guest or all guests, the processor 170 may update the recommendations based on the guest data. By way of example, the guest may have recently attended the amusement park and thus, the processor 170 may recommend the fifth game, which may be associated with the amusement park, as the top recommendation. Similarly, the processor 170 may update the set of popular games 28 of the popular games 22 and the set of archived games 30 of the archived games 24, based on the guest data. As such, the processor 170 may modify the game play content of the game play hub 10 based on the guest data (e.g., indicating guest preferences). Since the guest data may change, such as guest activity within the game play hub 10 and/or the amusement park changes, the game play content may be dynamically modified. For example, the processor 170 may periodically determine the guest data to accurately modify the game play content on the display interface 11 of the game play hub 10 and/or interactions at the amusement park for the most recent guest data.

Turning back to FIG. 6, the processor 170 may store (process block 214) the guest data for the user ID 12 (e.g., in the memory 172). That is, the processor 170 may receive new or additional data from the various sources previously described, indicating preferences, and may store this data for the guest. When storing, the processor 170 may tag the data with the user ID 12 for subsequent retrieval by the processor 170 to determine the guest data and correspondingly update the game play content.

Figure 8:
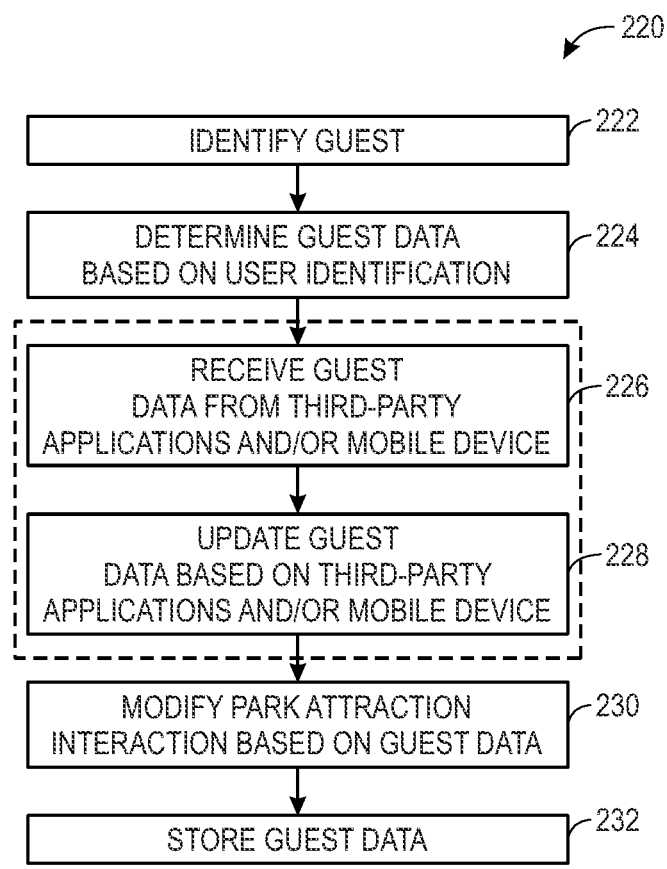
FIG. 8 is a process flow diagram for modifying guest-facing interactions at the amusement park, in accordance with an embodiment of the present disclosure.

To illustrate the process for providing modified interactions at an amusement park, FIG. 8 is a flow diagram of a process 220 for customizing guest-facing interactions at the amusement park. While the process 220 is described using acts in a specific sequence, it should be understood that the described acts may be performed in different sequences than the sequence illustrated, and certain described acts may be skipped or not performed altogether. In general, at least some of the steps of process 220 may be implemented at least in part by the game play system 150 of FIG. 5. Specifically, these steps may be implemented at least in part by the processor 170 of the controller 154 that executes instructions stored in a tangible, non-transitory, computer-readable medium, such as the memory 172. In alternative or additional embodiments, at least some steps of the process 220 may be implemented by any other suitable components or control logic, and the like.

To customize the game play content for the particular guest, the processor 170 may identify (process block 222) the guest. In particular, the processor 170 may identify a guest based on a user ID 12. By way of example, the input device 168 may provide sensor data to the processor 170, which may determine the presence and/or identify the guest using the sensor data. For example, the processor 170 may determine both the presence and identification of the guest using sensor data from scanning a guest wearable RFID tag 158 corresponding a user ID 12. Additionally or alternatively, the processor 170 may determine both the presence and identification of the guest by performing facial and/or body recognition analysis of an image captured by the camera 160, and subsequently associating the image with the particular guest and corresponding user ID 12.

As discussed in detail with respect to FIG. 6, the processor 170 may determine (process block 224) guest data based on the user ID 12 associated with the identified guest. That is, the processor 170 may retrieve guest data by the user ID 12, in which the guest data indicates guest preferences, tracked guest game activity within the game play hub 10, tracked guest park activity at the amusement, and so forth. In some embodiments, and as discussed in detail with respect to FIG. 6, the processor 170 may optionally (as indicated by dash line box) receive (process block 226) guest data from the third-party applications 186 and/or the mobile device 120. This may provide a more granular determination of guest preferences and information. In such embodiments, the processor 170 may update (processor block 228) the guest data based on the third-party applications 186 and/or the mobile device 120.

The processor 170 may modify (process block 230) park interactions based on the guest data (e.g., originally retrieved guest data and/or updated guest data), so that the guest may perceive the interactions as unique or customized for the guest. In particular, the processor 170 may modify the guest-facing attractions to provide a customized experience for the guest. This can include, for example, customized in-park experiences to reflect theming (e.g., super hero themes) that the guest data indicates to be of interest and additional options for in-park entertainment based on progress through an adventure game (e.g., achieving a certain level in the game).

Figure 9:
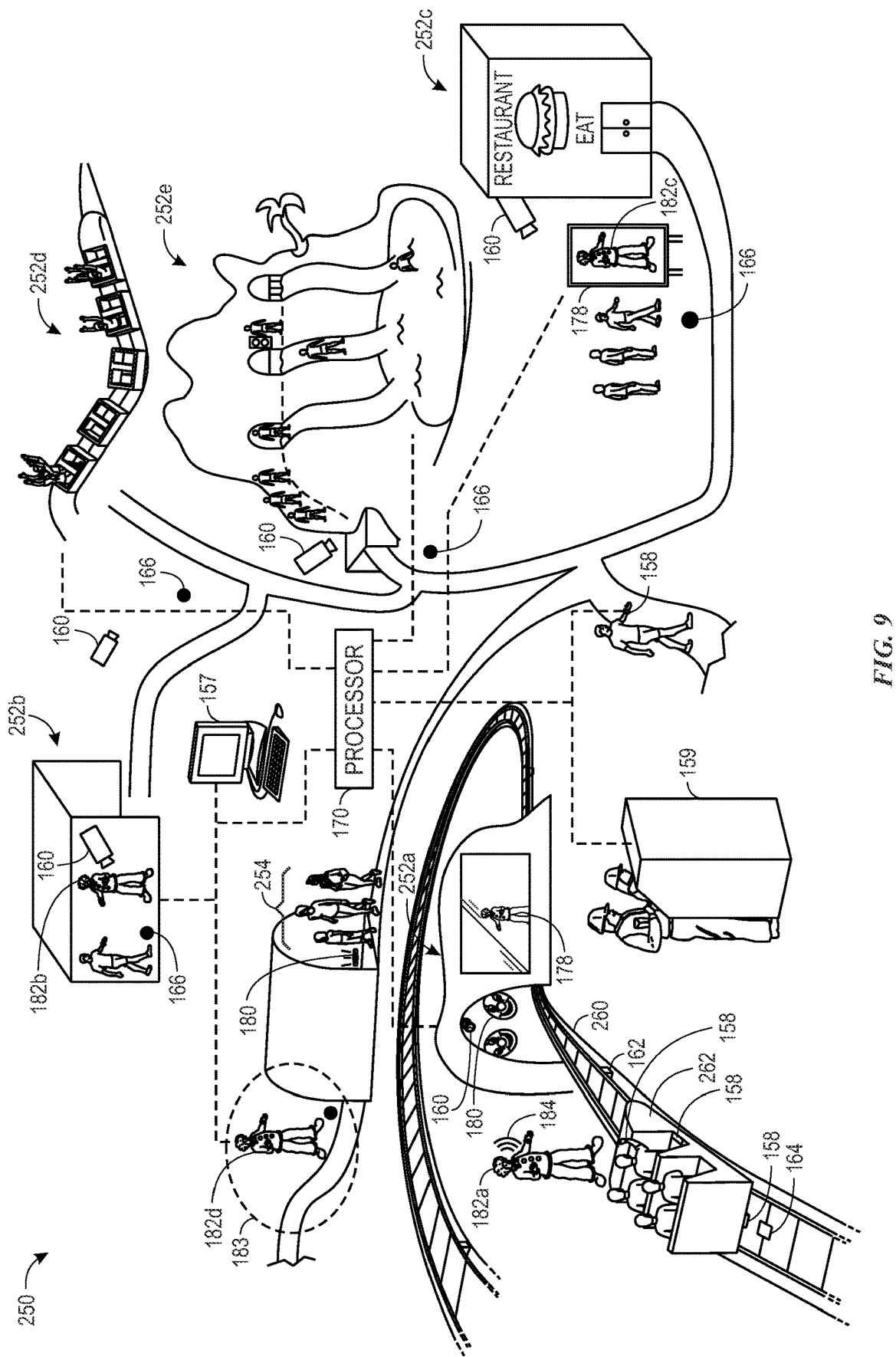
FIG. 9 is a schematic diagram of the amusement park with modified guest-facing interactions, in accordance with an embodiment of the present disclosure.

To illustrate, FIG. 9 is a schematic representation of an amusement park 250 with modified guest-facing interactions and attractions. In particular, the amusement park 250 includes one or more park features 156 (e.g., the display 178, the lighting effect 180, the animated FIG. 182, and/or the sound effect system 184) that may be modified for the particular guest, on or around various attractions, zones, pathways, or other areas of the amusement park 250. In the depicted embodiment, the amusement park 250 includes multiple attractions including a tunnel ride attraction 252*a*, a virtual game room attraction 252*b*, a restaurant attraction 252*c*, a roller coaster attraction 252*d*, and a water attraction 252*e*. Different embodiments of the animated figure 182 (e.g., 182*a-d*) may be found throughout the amusement park, and the processor 170 may modify interactions from each of them to react in a manner that the guests perceive as a response to the particular guest. For example, the restaurant attraction 252*c* and the tunnel ride attraction 252*a* may include displays 178 that display images of an animated figure 182. In response to detecting the particular guest, such as detecting the particular guest using proximity sensors 166 to detect a human presence and the cameras 160 to identify the particular guest, the processor 170 may cause the animated figure 182 to react based on the guest data. Moreover, a virtual embodiment or hologram of the animated figure (e.g., animated figure 182b) in a virtual game in the virtual game room 252b may react similarly.

By way of example, the processor 170 may determine that the guest is presently on the tunnel ride attraction 252a, for example, based on sensor data from the RFID tags 158. As shown, a ride cart 262 of the tunnel ride attraction 252a may include one or more RFID tags 158. As the ride cart 262 moves along the ride tracks 260, an electronic reader 164 on the ride track 260 may read the RFID tags 158, indicating presence of the ride cart 262. Based on the ride cart 262 being present and moving along the ride tracks 260, the processor 170 may determine that a guest is present within a threshold distance of interest, such as within a distance near one or more park features 156 that may be modified to interact with the guest. Additionally or alternatively, a weight sensor 162 positioned on the ride track 260 may detect a weight above a threshold weight when the ride cart 262 moves over the weight sensor 162, indicating presence of the ride cart 262.

After determining that the ride cart 262 is present and a guest is likely present, additional park sensors 152, such as the camera 160 and/or the guest wearable RFID tag 158, may trigger the additional park sensors 152 to send data to the processor 170 (e.g., through the input device 168 of FIG. 5) to assist in identifying the guest. For example, the processor 170 may perform an image analysis to match the image to one corresponding to a user ID 12. Additionally or alternatively to the camera 160, the processor 170 may analyze RFID tag data to associate it with user ID 12. In some embodiments, the processor may determine the presence and identify the guest using the camera 160 and/or the RFID tag 158 rather than initially determining the presence of the guest, for example, based on the weight of the ride cart 262.

After identifying the guest, the processor 170 may determine guest data for the user ID 12, and subsequently modify interactions of the tunnel ride attraction 252a based on the guest data. In the depicted embodiments, the guest data may indicate that the guest purchased a ticket to the Halloween event at the amusement park and that the guest fears clowns. In particular, the processor 170 may determine that the guest answered questions in the notification tab 16 of the game play hub 10 related to purchasing the ticket, and in response, the processor 170 requested additional information. For example, the processor 170 may request information related to fears for the particular guest, and the guest indicated a fear of clowns. As such, the processor 170 may modify the park features 156 accordingly. Thus, the processor 170 of the game play system 150 may modify the park features 156 at the amusement park 250 based on the guest data determined through the game play hub 10.

As shown, in addition to the animated figure on the display 178, the processor 170 may animate the animated figure 182a, for example, to make faces or gestures that scare the guest based on the guest data. In some embodiments, the animated figure 182a may be connected to or integrated with the sound effect system 184. Thus, the processor 170 may control the sound effect system 184 to provide audio to scare the guest. For example, the animated figure 182a may say the guest's name, ask about a game that the guest played earlier in the week, repeat information related to the Halloween event that the guest attended, ask about a family member by name, make comments related to amusement park zones that the guest visited, and so forth, as determined based on the guest data. By way of example, the guest data (e.g., number of tickets purchased for the amusement park 250) may indicate that the guest is visiting the amusement park 250 with two other family members and thus, the processor 170 retrieves data related to the two other family members (e.g., family member names tagged on social media application). During the ride on the tunnel ride attraction 252a, the processor 170 may analyze video data from the camera 160 that indicates that the guest is on the ride cart 262 with other guests and determines that the other guests are the family members. In some embodiments, the processor 170 may perform additional image analysis to match the video data to images on the social media application to confirm identity of the other guests. Thus, the processor 170 may address the other guests by their respective names, providing a customized interaction for the guest and/or the related guests. However, as previously mentioned, the guest may control the data shared with the game play system 150, and as such, the extent of interactivity may correspond to the extent of data shared. For example, the limitations may cause the processor 170 to limit the interactions to addressing only the guest by name and not the other family members.

The tunnel ride attraction 252a may include other sound effect systems 184 that the processor 170 modifies based on the guest data. For example, the processor 170 may cause the sound effect system 184 to play audio associated with the guest's favorite game on the game play hub 10 (e.g., theme song). The processor 170 may cause the lighting effect system 180 to project clown faces in the tunnel of the tunnel ride attraction 252a based on the guest data. In some embodiments, the park features 156 may dynamically change based on the particular guest positioned within a threshold distance from the park features 156. Based on the guest location relative to the park feature 156, the processor 170 may modify the park features 156 based on the particular guest. For example, the processor 170 may modify park features 156 on the left side of the tunnel ride attraction 252a for the guest positioned on the left side of the ride cart 262 while modifying park features on the right side of the tunnel ride attraction 252a for the guest positioned on the right side of the ride cart 262. Similarly, the processor 170 may stop and/or switch modifying the park features 156 for a different guest (e.g., project spiders in the tunnel for the guest on the next ride cart 262) as the tracked guest moves out of range from the park features 156 and another guest moves within range from the park features 156 (e.g., as the ride carts 262 move along the ride track 260).

By way of another example, the processor 170 may modify the animated figure 182d based on an identified guest in closest proximity and within a threshold range 183 from the animated figure 182d. As shown, in a group of guests 254, the processor 170 may cause the animated figure 182d to react to the guest that is the first guest to be within the threshold range 183. The processor 170 may stop and/or switch the interactions (e.g., to a second guest to be within the threshold range 183) after the first guest is out of the threshold range 183 and/or after a predetermined time for interacting with the guest. The processor 170 may also cause varied interactions depending on groups (e.g., a first interaction when a first guest is present, a second interaction when a second guest is present, a third interaction when the first and second guest are present together, and so forth) and a combination of preferences of individuals in the group. For example, an overlap of interest between a majority of group members may be identified and used to provide interactions, random selections or combinations of interactions may be selected based on preferences of those in the group, interactions may be cycled through based on group preferences, and so forth. In some embodiments, the processor 170 may cause the animated FIG. 182*d* to turn around to provide modified interactions when a guest is within the threshold range 183 but not facing the animated figure 182*d*. As previously discussed in detail with respect to FIG. 5, the monitoring system 157 and/or the service desk 159 may monitor the amusement park 250 and the processor 170 of the game play system 150 to ensure that the park operations are completed as expected.

Turning back to FIG. 8, the processor 170 may store (process block 232) the guest data for the user ID 12. That is, the processor 170 may receive new or additional data from the various sources previously described, indicating preferences, and may store this data for the guest. For example, the new data may include guest activity associated with the modified park features 156 (e.g., reactions) and/or services provided to the guest (e.g., service desk 159 resolves unexpectedly long queue for a ride that the guest visited). When storing, the processor 170 may tag the data with the user ID 12, for subsequent retrieval by the processor 170 to determine the guest data and correspondingly update the park interactions. In this manner, the game play system 150 may integrate guest activity at both the amusement park 250 and the game play hub 10 to provide guest-facing interactions that are unique to the guest.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An integrated game play system, comprising:
a game play platform configured to provide access to a plurality of games;
an amusement park comprising an attraction comprising one or more attraction features; and
a controller configured to:
determine presence of a guest at the attraction;
determine a guest identifier of the guest;
access guest data based on the guest identifier of the guest, wherein the guest data comprises game activity of the guest in the plurality of games;
determine a modification to the one or more attraction features based on the guest data; and
send a control signal to implement the modification of the one or more attraction features.

2. The integrated game play system of claim 1, wherein the controller is configured to:
track park activity of the guest at the amusement park; and
store the tracked park activity as the guest data.

3. The integrated game play system of claim 1, wherein the guest data comprises device data of a mobile device associated with the guest, and to access the guest data, the controller is configured to:
request data from the game play platform and the mobile device associated with the guest.

4. The integrated game play system of claim 1, wherein the guest data comprises third-party data relevant to the guest, and to access the guest data, the controller is configured to:
request data from the game play platform and a third-party application, the third-party application comprising a social media application, a medical application, a banking application, a global positioning system application, or a combination thereof.

5. The integrated game play system of claim 1, wherein the controller is configured to:
determine presence of an additional guest with the guest at the attraction; and
determine respective preferences of the guest and the additional guest based on the guest data;
wherein the modification to the one or more attraction features correlates to the respective preferences associated with the guest and the additional guest.

6. The integrated game play system of claim 1, wherein granularity of the guest data correlates to a limit set on sharing data from the game play platform, the amusement park, or a combination thereof.

7. The integrated game play system of claim 1, wherein the one or more attraction features comprise an animated figure, a lighting effect, a sound effect, a display, or a combination thereof.

8. The integrated game play system of claim 1, wherein, to determine the presence of the guest, the controller is configured to determine that the guest is within a threshold distance from the one or more attraction features based on sensor data from one or more sensors proximate to the one or more attraction features.

9. The integrated game play system of claim 8, wherein the one or more sensors comprise:
an electronic reader configured to read a radio frequency identification device (RFID) tag,
a camera,
a weight sensor, or
any combination thereof.

10. The integrated game play system of claim 1, wherein the game play platform is configured to provide one or more notifications associated with the amusement park.

11. The integrated game play system of claim 1, wherein the controller is configured to:
determine an additional modification to a layout of game play icons for the game play platform based on the guest data, wherein the guest data comprises park activity of the guest at the amusement park; and
send an additional control signal to implement the additional modification to the layout of the game play icons for the game play platform.

12. The integrated game play system of claim 1, wherein the game play platform is configured to enable the guest to access the plurality of games via a mobile device carried by the guest, and the mobile device is separate from the attraction.

13. The integrated game play system of claim 1, wherein the guest data comprises device data of a mobile device associated with the guest and third-party data relevant to the guest, and to access the guest data, the controller is configured to:

request data from the game play platform, the mobile device associated with the guest, and a third-party application, the third-party application comprising a social media application, a medical application, a banking application, a global positioning system application, or a combination thereof.

14. A method, comprising:

receiving an indication that a guest is online on a game play platform;

identifying the guest to be associated with a user identification;

determining guest data based on the user identification, wherein the guest data corresponds to guest park activity at an amusement park associated with the game play platform; and modifying an order of a plurality of game play icons on a display interface of the game play platform based on the guest data, wherein each game play icon of the plurality of game play icons corresponds to a respective game application.

15. The method of claim 14, comprising:

receiving additional guest data from third-party applications, a mobile device associated with the guest, or a combination thereof; and updating the guest data based on the additional guest data prior to modifying the order of the plurality of game play icons.

16. The method of claim 15, comprising:

tagging the updated guest data with the user identification; and storing the updated guest data as the guest data.

17. The method of claim 15, comprising:

confirming the guest data with the guest at the game play platform prior to updating the guest data.

18. The method of claim 14, wherein the guest data indicates respective times that the guest spent in each zone of the amusement park, and modifying the order of the plurality of game play icons comprises providing the plurality of game play icons such that a first game play icon in the order corresponds to a theme of a first zone of the amusement park in which the guest spent a greatest amount of time.

19. A method, comprising:

receiving sensor data from one or more sensors indicating a presence of a guest proximate to one or more attraction features of an amusement park attraction;

identifying the guest to be associated with a user identification;

accessing guest data from one or more third-party applications based on the user identification;

determining preferences of the guest based on the guest data;

and modifying the one or more attraction features of the amusement park attraction based on the preferences of the guest during the presence of the guest proximate to the one or more attraction features of the amusement park attraction.

20. The method of claim 19, wherein the modifying comprises at least changing an animated figure, a lighting effect, a sound effect, a display, or a combination thereof, of the amusement park attraction.

* * * * *